(12) United States Patent
Tanaka et al.

(10) Patent No.: US 7,061,525 B1
(45) Date of Patent: Jun. 13, 2006

(54) APPARATUS AND METHOD FOR CONTROLLING A CAMERA BASED ON A DISPLAYED IMAGE

(75) Inventors: Koichiro Tanaka, Yokohama (JP); Hiroki Yonezawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/009,932

(22) Filed: Jan. 21, 1998

(30) Foreign Application Priority Data

Jan. 28, 1997 (JP) .............................................. 9/013943

(51) Int. Cl.
*H04N 5/232* (2006.01)
*H04N 5/222* (2006.01)

(52) U.S. Cl. ................ 348/211.8; 348/211.3; 348/211.13; 348/333.03

(58) Field of Classification Search ................ 348/207, 348/211, 212, 213, 333.01, 333.02, 333.11, 348/333.12, 135, 141, 143, 552, 211.99, 211.1, 348/211.2, 211.4–211.8, 211.11, 211.12, 348/211.13, 233.03
See application file for complete search history.

(56) References Cited

U.S. PATENT DOCUMENTS

| | | | | |
|---|---|---|---|---|
| 5,396,287 A | * | 3/1995 | Cho | ........................ 348/211.8 |
| 5,412,400 A | * | 5/1995 | Takahara | ..................... 345/788 |
| 5,523,783 A | * | 6/1996 | Cho | ........................... 348/157 |
| 5,568,183 A | * | 10/1996 | Cortjens | ..................... 348/211 |
| 5,793,367 A | * | 8/1998 | Taguchi | ...................... 348/211 |
| 5,808,670 A | * | 9/1998 | Oyashiki | .................... 348/143 |
| 5,838,368 A | * | 11/1998 | Masunaga | .................. 348/211 |
| 5,872,594 A | * | 2/1999 | Thompson | ................. 348/213 |
| 5,909,543 A | * | 6/1999 | Tanaka | .................. 395/200.34 |
| 5,929,904 A | * | 7/1999 | Uchida | ....................... 348/143 |
| 6,002,995 A | * | 12/1999 | Suzuki | ...................... 702/188 |
| 6,008,837 A | * | 12/1999 | Yonezawa | .................. 348/722 |
| 6,266,085 B1 | * | 7/2001 | Kato | ......................... 348/211 |
| 6,400,401 B1 | * | 6/2002 | Morino | .................... 348/211.1 |

FOREIGN PATENT DOCUMENTS

| | | | |
|---|---|---|---|
| JP | 4-302587 | * | 10/1992 |
| JP | 9-186923 | | 7/1997 |

* cited by examiner

*Primary Examiner*—Aung Moe
*Assistant Examiner*—Jason Whipkey
(74) *Attorney, Agent, or Firm*—Fitzpatrick, Cella, Harper & Scinto

(57) ABSTRACT

In an image receiving apparatus, a command for operating a camera is detected on the screen of a monitor on which an image formed by the camera is displayed. The detected camera operating command is recognized and a camera control command is formed on the basis of the recognized camera operating command to be transmitted to an image transmitting apparatus.

6 Claims, 20 Drawing Sheets

PRIOR ART

APPARATUS AND METHOD FOR CONTROLLING A CAMERA BASED ON A DISPLAYED IMAGE

BACKGROUND OF THE INVENTION

1. Field of the Invention

The present invention relates to a camera control system, and to a camera control method suitable for use with a system in which information communication is performed through a network, for example, a monitoring camera system or a television conference system.

2. Description of the Related Art

Conventionally, monitoring systems employing cameras have been used in comparatively small buildings. In such monitoring systems, a certain number of cameras are operated to form images of objects to be observed and the images in accordance with analog image signals output from the cameras are displayed on a plurality of monitor screens.

A camera control system has been proposed which can connect a plurality of cameras of a monitoring system of the above-described kind to a digital network such as a local area network (LAN) or to a public digital network such as an integrated service digital network (ISDN), and which enables a larger number of cameras in remoter places to be easily connected to the monitoring center.

For use in such a camera control system, a system has also been proposed in which a personal computer or a workstation is used as a camera operating terminal to perform camera control and image display with camera operations using a graphical user interface (GUI).

Such a graphical system has the advantage of enabling even a person unfamiliar with the control system to easily execute desired control operations. In particular, the facility of control can be improved by the method of displaying on a monitor screen a control panel of a camera along with the image output from the camera.

The method of displaying a control panel of a camera along with the image output from the camera on the monitor screen, however, entails a problem of a need to reduce the size of the image from the camera so as to leave a space for display of the camera control panel, as shown in FIG. 21, or a need to display the control panel so that the control panel overlaps the displayed image.

SUMMARY OF THE INVENTION

In view of the above-described problem, an object of the present invention is to provide a camera control system enabling an operator to intuitively control a camera while a large-area display of the image formed-by the camera is provided.

To achieve the above-described object, according to one aspect of the present invention, there is provided a camera control system comprising display means for displaying an image formed by a camera on the basis of an image signal output from the camera, detection means for detecting a figure described on a display surface on which the image is being displayed by the display means, output means for outputting a command for controlling the camera on the basis of the figure detected by the detection means, control means for controlling the camera on the basis of the camera control command output from the output means.

According to another aspect of the present invention, there is provided a camera control apparatus comprising display means for displaying an image formed by a camera on the basis of an image signal output from the camera, detection means for detecting a figure described on a display surface on which the image is being displayed by the display means, and output means for outputting a command for controlling the camera on the basis of the figure detected by the detection means.

According to still another aspect of the present invention, there is provided a method of controlling a camera control system comprising a detection step of detecting a figure described on a display surface on which an image formed by a camera is being displayed, and an output step of outputting a command for controlling the camera on the basis of the figure detected in the detection step.

According to a further aspect of the present invention, there is provided a storage medium for storing programs for executing operational processings in a camera control apparatus, the storage medium being stored with programs for executing processings for displaying an image formed by a camera on the basis of an image signal output from the camera, detecting a figure described on a display surface on which the image is being displayed, and outputting a command for controlling the camera on the basis of the detected figure.

According to still a further aspect of the present invention, a camera control system comprises a monitor for displaying an image sensed by a camera, the displayed image corresponding to an image signal output from the camera. A detector is provided for detecting a gestural sign on a display surface on which the image is being displayed by said monitor. An interface is also provided for outputting a command for controlling the camera on the basis of the gestural signal detected by said detector. Finally, a controller controls the camera on the basis of the camera control command output from the output means.

These and other objects, features and advantages of the present invention will become apparent from the following description and the accompanying drawings.

DESCRIPTION OF THE PREFERRED EMBODIMENT

A preferred embodiment of the present invention will be described below in detail with reference to the accompanying drawings.

Figure 1:
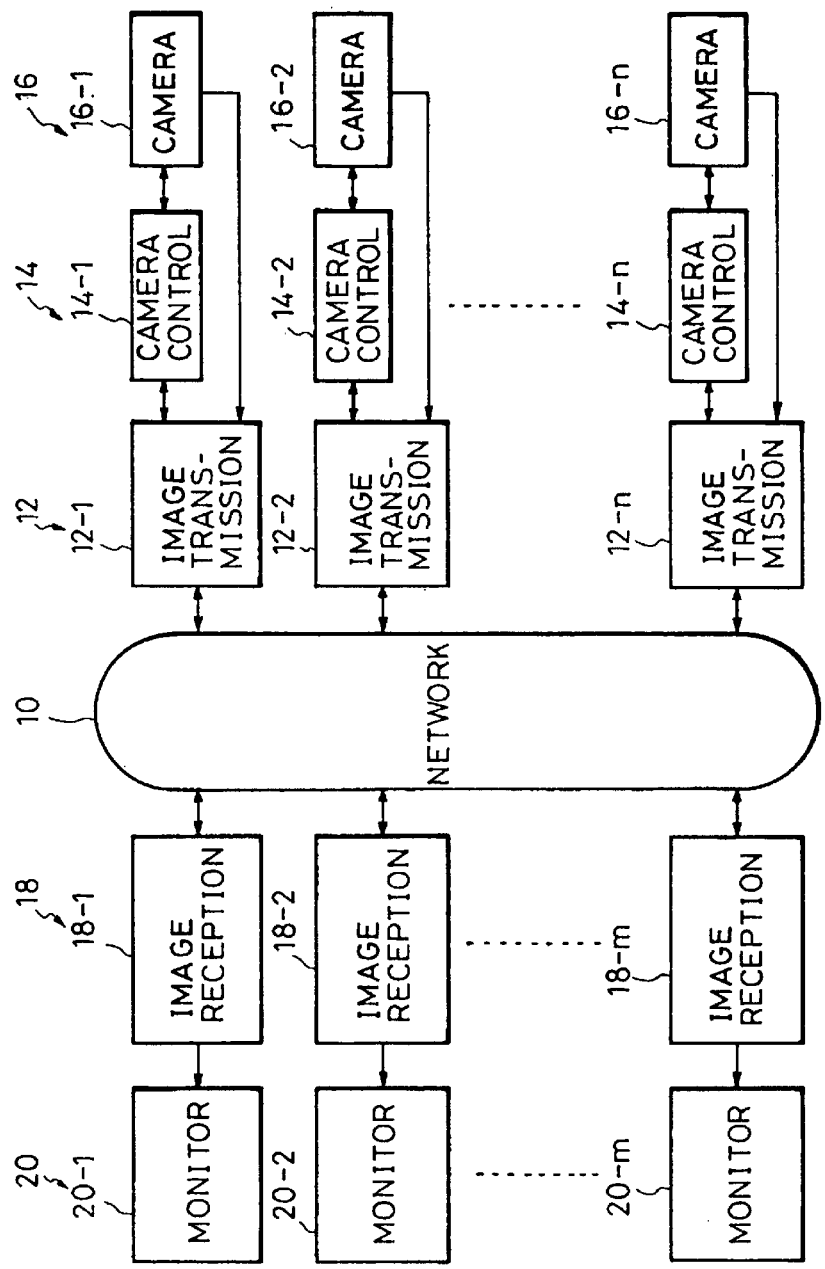
FIG. 1 is a diagram showing the configuration of a camera control system.

FIG. 1 schematically shows the configuration of a camera control system which represents an embodiment of the present invention. Image transmission terminals 12 (12-1 to 12-n) are connected to a network 10, through which image data and camera control information (including status information) in a digital form are transmitted.

To the image transmission terminals 12 (12-1 to 12-n), which function as camera servers, cameras 16 (16-1 to 16-n) are connected through camera controllers 14 (14-1 to 14-n). Each of the camera controllers 14 (14-1 to 14-n) controls pan, tilt, zoom and focusing of the corresponding one of the cameras 16 (16-1 to 16-n), with which it connects, in accordance with a control signal from the corresponding one of the image transmission terminals 12 (12-1 to 12-n).

The cameras 16 (16-1 to 16-n) are supplied with electric power from the camera controllers 14 (14-1 to 14-n). Each of the camera controllers 14 (14-1 to 14-n) performs on-off control of the corresponding one of the cameras 16 (16-1 to 16-n) in accordance with an external control signal.

To the network 10 are also connected image reception terminals 18 (18-1 to 18-m) which receive image information sent from the image transmission terminals 12 (12-1 to 12-n) into the network 10, and which display images formed by the cameras. To the image reception terminals 18 (18-1 to 18-m), which are client terminals, monitors 20 (20-1 to 20-m) constituted of bit-map displays, cathode ray tubes (CRTs) or the like are connected.

The network 10, which is not necessarily a wired network, may be a wireless network using wireless LAN apparatus. In such a case, image reception terminals 18 may be portable image reception terminals integral with monitors 20.

Each of the image transmission terminals 12 (12-1 to 12-n) compresses an image signal output from the corresponding one of the cameras 16 (16-1 to 16-n) in accordance with a predetermined compression system such as H.261, MPEG (Moving Image Experts Group) or Motion JPEG (Joint Photographic Experts Group), and transmits the compressed image signal to some of the image reception terminals 18 requesting the image or to all the image reception terminals 18. Each image reception terminal 18 is capable of controlling various parameters of the cameras 16 (shooting direction, image magnification, focus, aperture and so on) as well as power supply on-off control.

Each image transmission terminal 12 can also be used as an image reception terminal if a monitor is connected to it and if it is provided with an image expansion unit for expanding compressed images. On the other hand, each image reception terminal 18 can also be used as an image transmission terminal if camera controller 14 and camera 16 are connected to it and if it is provided with an image compression unit. In such case, these terminals are provided with read only memories (ROMs) for storing programs for executing image transmission and reception processings.

Figure 2:
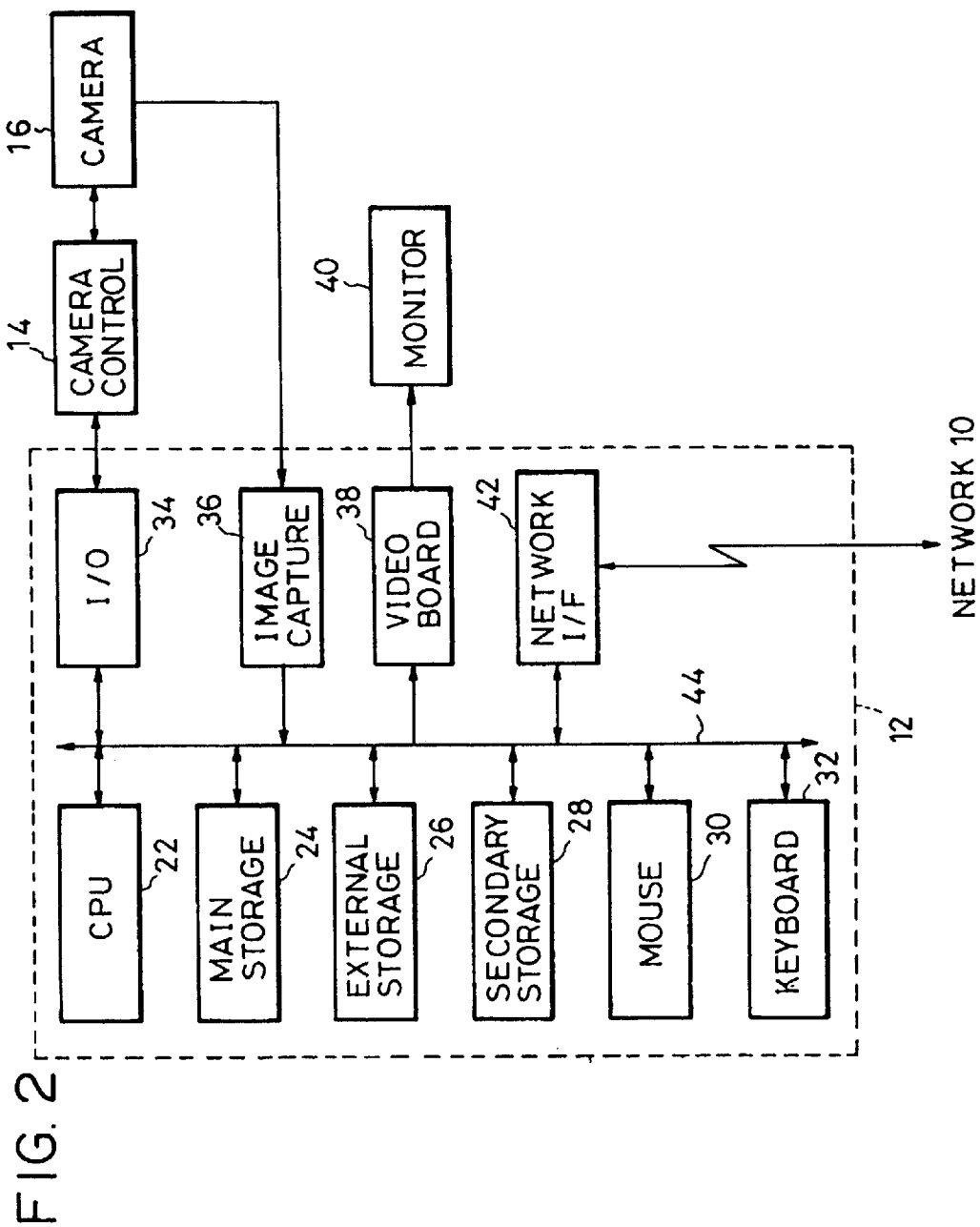
FIG. 2 is a block diagram showing the configuration of an image transmission terminal 12.

FIG. 2 is a block diagram schematically showing the configuration of each image transmission terminal 12. The image transmission terminal 12 has a central processing unit (CPU) 22 for overall control of the image transmission terminal 12, a main storage 24 (random access memory (RAM)), a removable external storage 26 such as a floppy disk or a compact disk read only memory (CD-ROM), a secondary storage 28 such as a hard disk, a mouse 30 which functions as a pointing device, a keyboard 32, an I/O board 34 to which the camera controller is connected, and which transmits or receives a camera control signal, and an image capture unit 36 which captures the image output signal from the camera 16.

The image capture unit 36 of this embodiment has an A/D conversion function for converting an analog video signal into a digital signal, and an image compression function for compressing image information.

The image transmission terminal 12 also has a video board 38 for displaying image information on the screen of a monitor 40, a network interface 42, and a system bus 44 which connects the components 22 to 38, and 42 to each other. If the terminal 12 is provided as a unit for image transmission only, the video board 38 and the monitor 40 can be removed.

The thus-arranged image transmission terminal 12 transmits an image signal to some image reception terminal 18 in a remote place, receives a camera control signal transmitted from the image reception terminal 18, and executes control of pan, tilt and so on of the camera 16.

Figure 3:
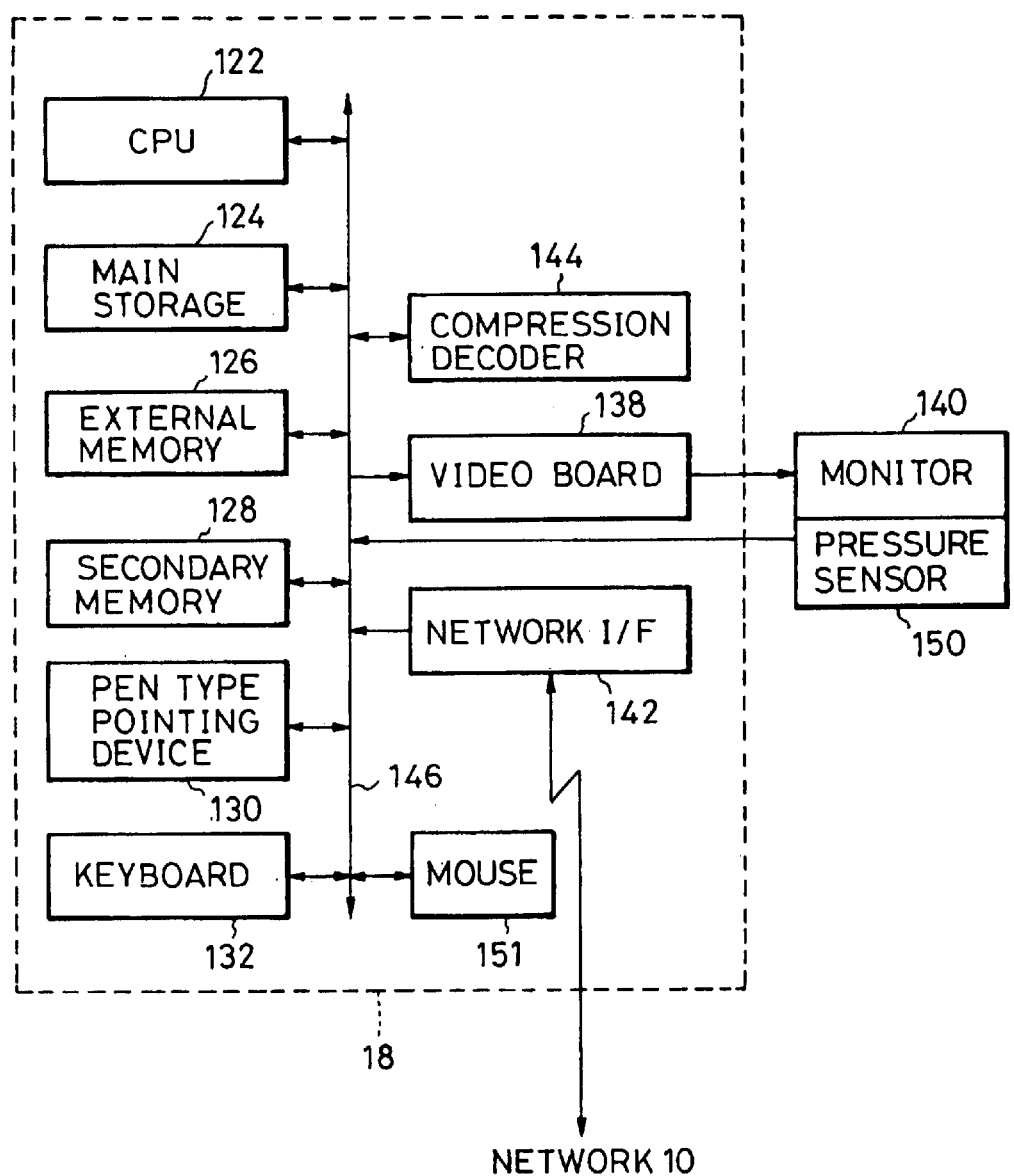
FIG. 3 is a block diagram showing the configuration of an image reception terminal 18.

FIG. 3 is a block diagram schematically showing the configuration of each image reception terminal 18. The image reception terminal 18 has a central processing unit (CPU) for overall control of the image reception terminal 18, a main storage 124 (RAM), a removable external storage 126 such as a floppy disk or a CD-ROM, a secondary storage 128 such as a hard disk, a keyboard 132, a mouse 151 which functions as a pointing device, a video board 138 for displaying image information on the screen of an image information monitor 140, a network interface 142, a compression decoder 144 for expanding compressed image information, and a system bus 146 which connects the components of the image reception terminal 18 to each other.

The image reception terminal 18 also has a pen type pointing device 130, which is used to input gestural signs described below on the screen of the monitor 140. A pressure sensor 150 is provided on the display screen of the monitor 140. The pressure sensor 150 detects a pressure when the display screen of the monitor 140 is pressed with the pen type pointing device 130, and transmits an address signal corresponding to a detected area to the CPU 122. The CPU 122 identifies a gestural sign described with the pen type pointing device 130 on the basis of a signal transmitted from the pressure sensor 150.

The pressure sensor 150 for detecting contact between the pen type pointing device 130 and the display screen is formed of transparent materials and the pressure detection system of the pressure sensor 150 may be of any type such as an electrostatic capacity type, a surface acoustic wave type, a resistance film type, or an infrared type. For example, if an electrostatic capacity system is used, contact with the panel surface can be recognized from a change in electrostatic capacity and the position of contact can be detected from changes in small ac currents supplied to the pressure sensor 150. Information on the state of contact, expressed as coordinate data, is supplied to the CPU 122 to identify a gestural sign described on the display screen.

The image reception terminal 18 has the same configuration as the image transmission terminal 12 shown in FIG. 2 except that it does not have the function of controlling a camera and taking in an image formed by the camera, and that is has a decoder 144 for expanding a compressed image and uses different system software. If the image transmission terminal 18 has image transmission terminal software loaded therein, it can transmit an image output signal to some other image reception terminals 18.

The image reception terminal 18 transmits a camera control signal to one of image transmission terminals 12, and the image transmission terminal 12 controls the camera 16 in accordance with the content of the camera control signal and sends back information on the present status of the controlled camera 16. The image reception terminal 18 receives image data sent from the image transmission terminal 12, processes the data by predetermined kinds of processing and displays the image on the display screen of the monitor 140 in a real time manner.

Figure 4:
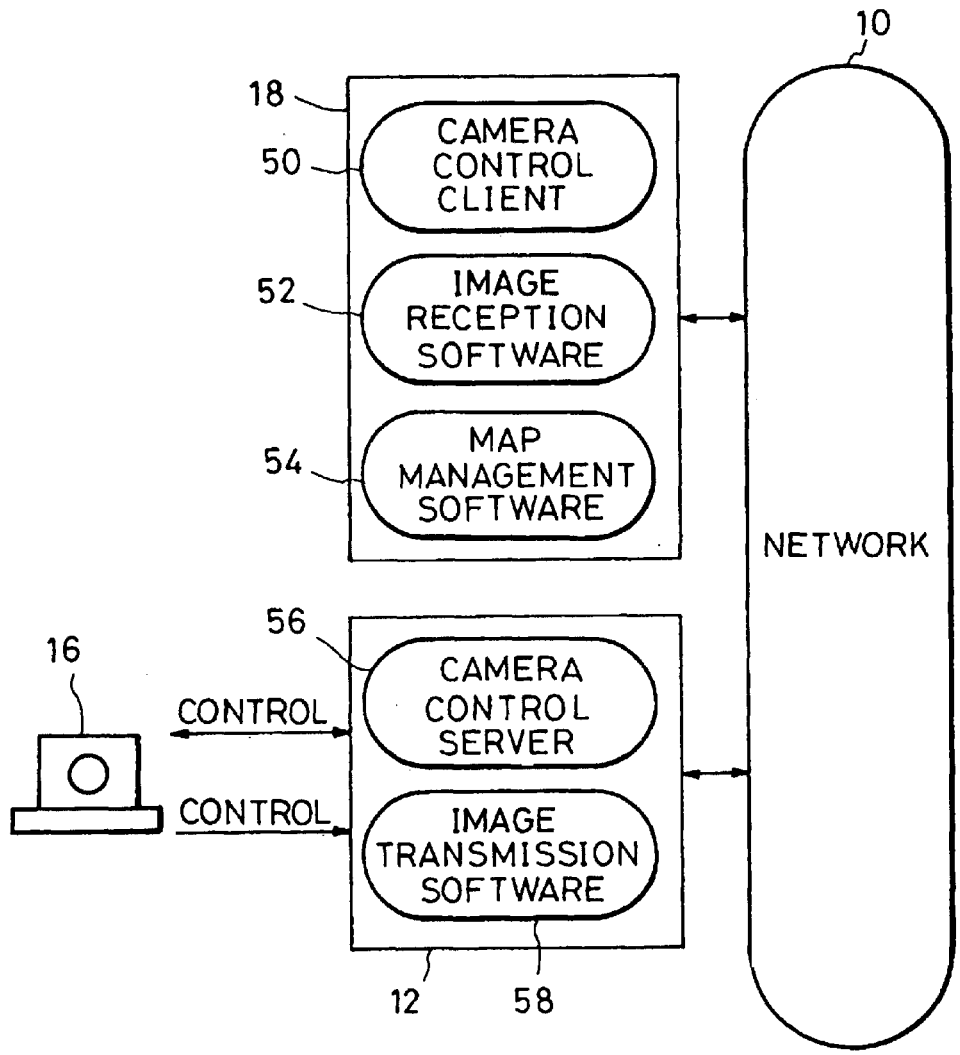
FIG. 4 is a diagram showing the configuration of the camera control system.

FIG. 4 shows the configuration of the camera control system of this embodiment in terms of software. In the secondary storage 128 of each image reception terminal 18 are stored a camera control client (software) 50 for remote-controlling each of the cameras 16 when the image reception terminal 18 is connected to the corresponding image transmission terminal 12 through the network 10, image reception software 52 for expanding compressed image data from the image transmission terminal 12 and displaying the data on the monitor screen, and map management software 54 for displaying icons representing the arranged positions and the present statuses of the cameras 16, and other programs.

Image reception software 52 is software for management of all the cameras 16 connected to the image transmission terminals 12 connected to the network 10. It includes fixed information and various kinds of changeable information of each camera 16 (e.g., a name of the camera, a host name or a name of the image transmission terminal 12 to which the camera 16 is presently connected, the state of the camera with respect to pan, tilt and zoom, possibility or impossibility of camera control, and identification of cameras 16 presently controlled by the terminal using this software or identification of cameras 16 from which displayed images are supplied). These kinds of information are also supplied to the camera control client 50 and to the map management software 54 and are used, for example, when the camera icon display is changed.

In the secondary storage 28 of each image transmission terminal 12 are stored a camera control server (software) 56 for controlling the camera 16 with the camera controller 14 according to a request from one of the camera control clients 50 and informing the requester of information on the present status of the camera 16 (the state of use of camera 16 and the like), and image transmission software 58 for compressing the output image from the camera 16 and transmitting the compressed image in a predetermined format to a requester through the network 10.

Figure 5:
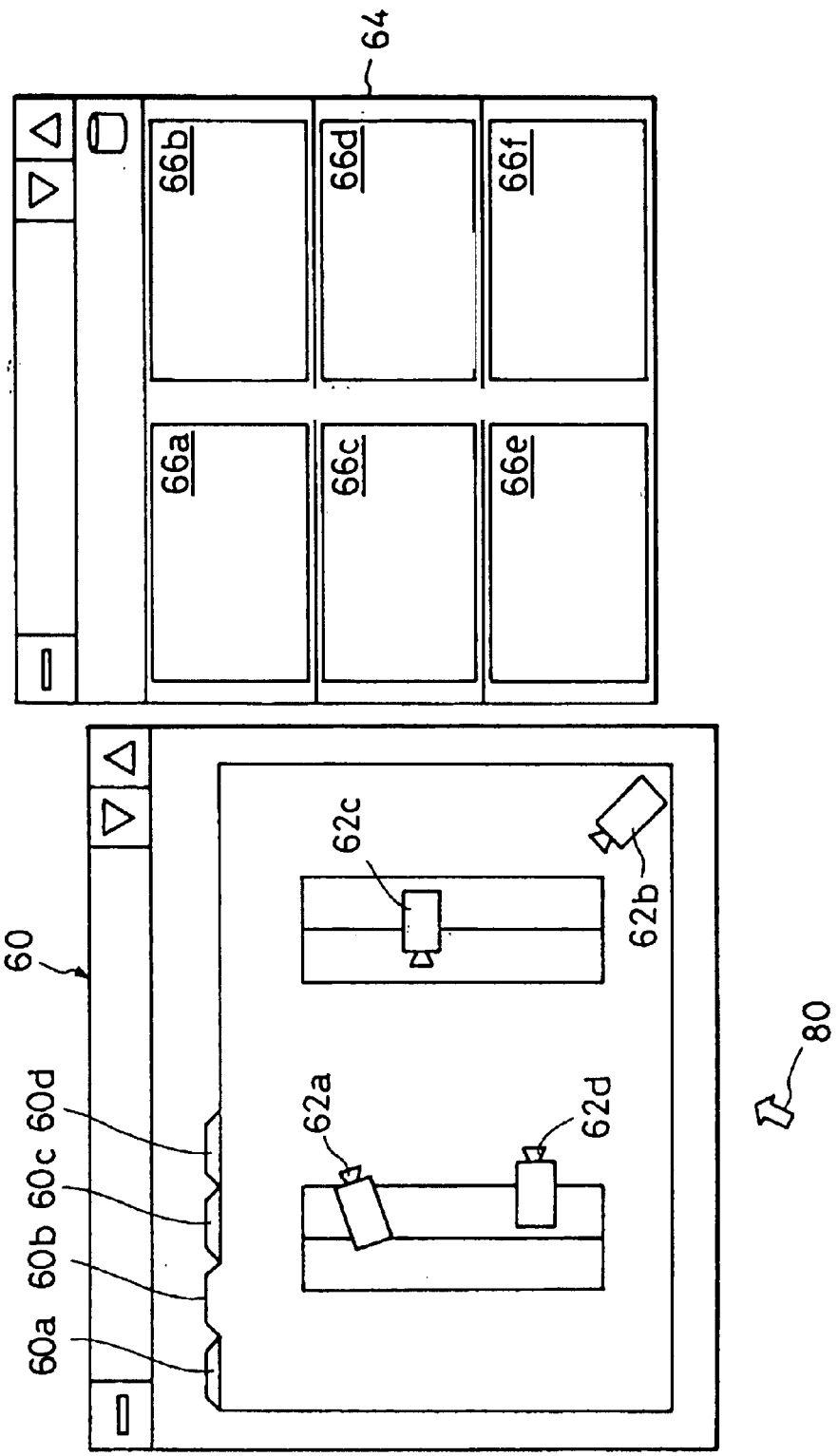
FIG. 5 is a diagram showing an example of the contents of a display on the monitor screen of the image reception terminal 18.

FIG. 5 shows an example of the contents of a display on the monitor screen of one of the image transmission terminals 18. In a map window 60, the layout of a plurality of cameras 16 placed in an office, a store or a warehouse is shown. A plurality of maps 60a, 60b, 60c, and 60d can be displayed selectively. The number of displayable maps is not particularly limited.

Figure 6:
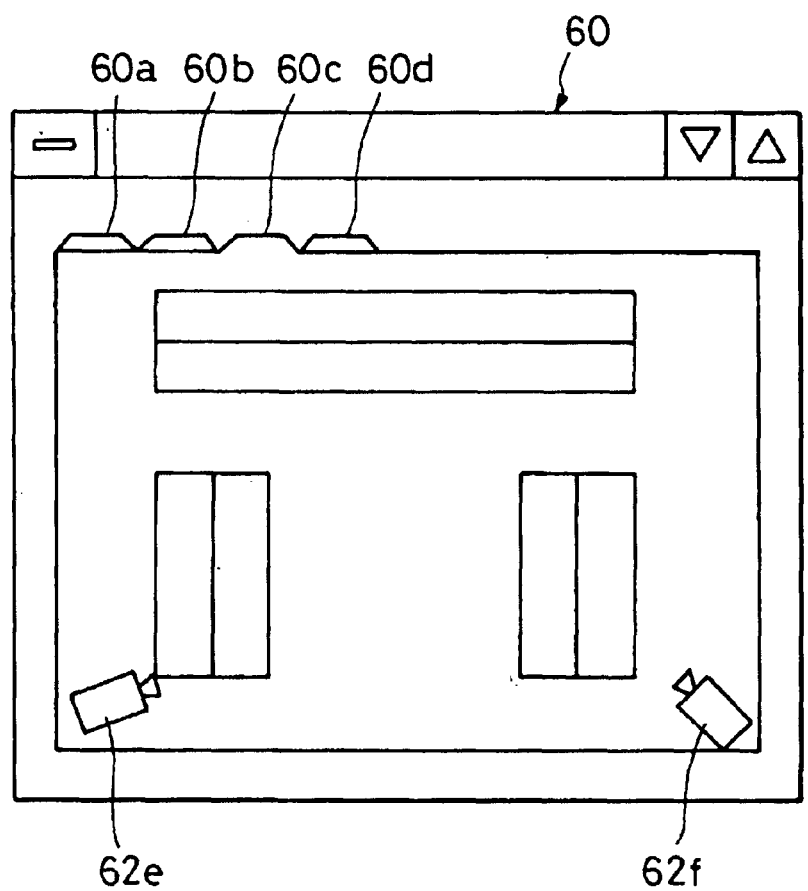
FIG. 6 is a diagram showing an example of the contents of a display on the monitor screen of the image reception terminal 18.

As shown in FIG. 5, tags are attached to the maps 60a to 60d. Each of the maps 60a to 60d can be selectively displayed in the front by clicking the pen type pointing device 130 pointing at the corresponding tag or by moving a cursor 80 onto the tag with the mouse 151 and clicking the mouse 151 when the cursor is positioned on the tag. In the example shown in FIG. 5, the map 60b is displayed in the front and camera icons 62a, 62b, 62c, and 62d representing disposed cameras are shown in the map 60b. If there is a request for changing the display in the map window 60 from the map 60b to the map 60c, the pen type pointing device 130 pointing at the tag of the map 60c or the mouse 151 with the cursor placed on the tag of the map 60c is clicked, thereby displaying the map 60c, as shown in FIG. 6. Camera icons 62e and 62f corresponding to two cameras disposed in the mapped area are shown in the map 60c. The camera icons 62a to 62f are displayed so as to face in the directions corresponding to the shooting directions of the cameras 16 represented by the camera icons 62a to 62f.

A window 64 is an image display window having image display areas 66a to 66f, in which images from the cameras 16 are shown. The image display window 64 has a display mode for showing a plurality of image display areas, as shown in FIG. 5, and another display mode for observing only one of the plurality of images in an enlarged state. In the description of this embodiment, the former mode will hereinafter be referred to as "views mode", and the latter mode as "watch mode".

In the camera control system of this embodiment, if there is a request for displaying an image formed by one of the cameras 16, a sequence of operations comprising selecting the icon representing the camera 16 on the corresponding map in the map window 60, superposing the icon on one of the image display areas 66a to 66f of the image display window 64 and releasing the icon in the superposed state (drag and drop) is performed. The image formed by the camera 16 is thereby displayed in the image display area onto which the icon has been dragged and dropped.

Figure 7:
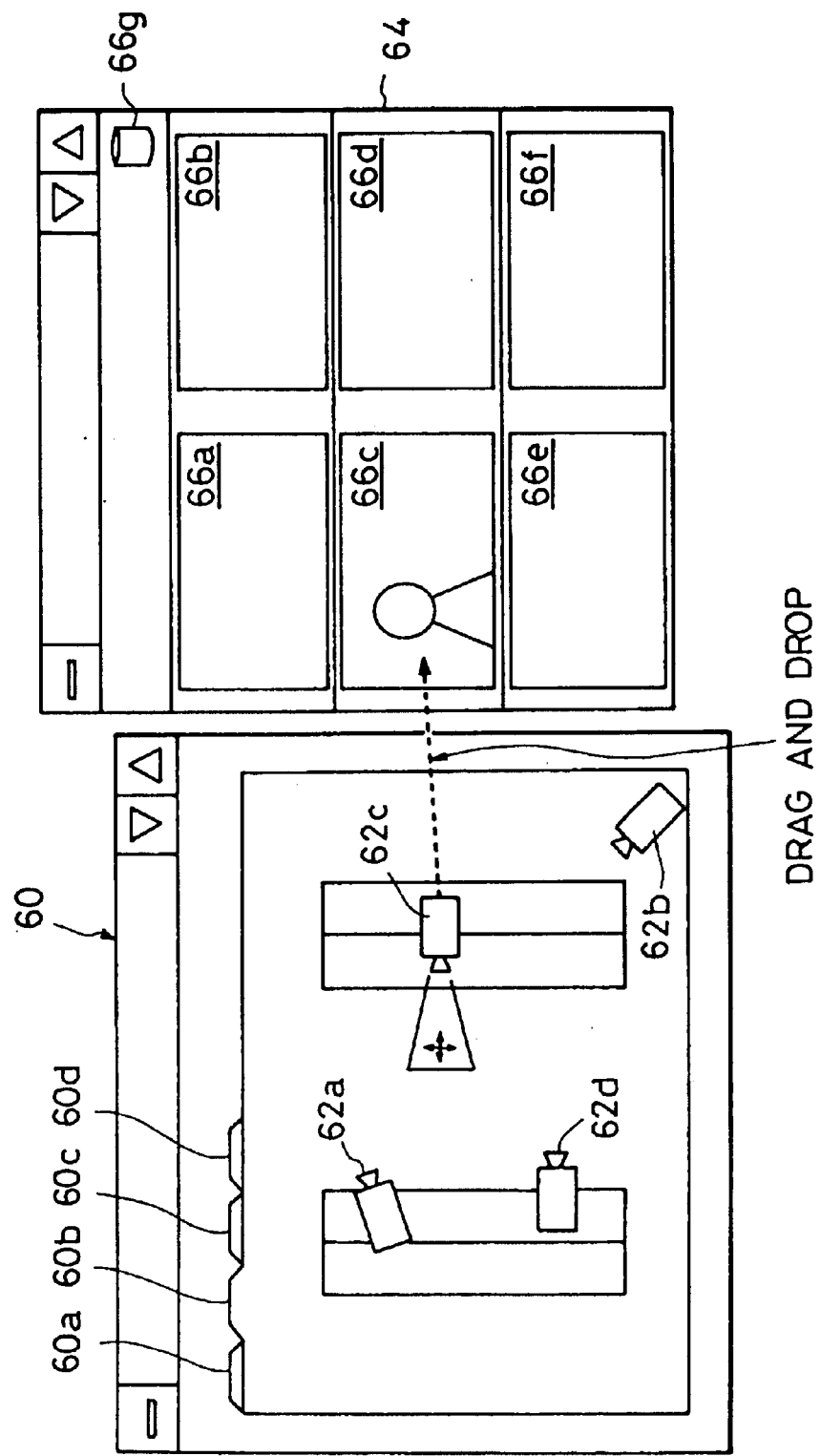
FIG. 7 is a diagram showing an example of the contents of a display on the monitor screen of the image reception terminal 18.
Figure 8:
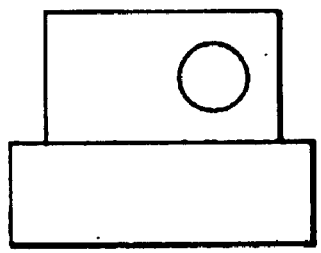
FIG. 8 is a diagram showing an example of a display of a camera icon when the camera icon is dragged.

FIG. 7 shows a case where the camera icon 62c is dragged and dropped onto the image display area 66c to display the image formed by the camera 16 corresponding to the camera icon 62c in the image display area 66c. When the camera icon 62c is being dragged for this operation, it is changed into a shape such as that shown in FIG. 8 to indicate the state of being dragged.

In operational processing in the image reception terminal 18 in this situation, the map management software 54 informs the image reception software 52 of the identity of the camera corresponding to the selected icon. The image reception software 52 finds, from this identity, the camera direction, the camera name and the name of the host to which the camera is connected. The image reception software 52 informs the camera control client 50 and the map management software 54 of these information items. The camera control client 50 and the map management software 54 execute the above-described operations on the basis of this control information.

If the above-described camera icon drag and drop operation is executed on one of the image display areas where an image is currently being displayed, a warning display is made to provide notice to the operator that the camera outputting the image will be changed, thereby enabling the operator to select or cancel the display of an image corresponding to a newly dragged and dropped icon in the image display area.

Figure 9:
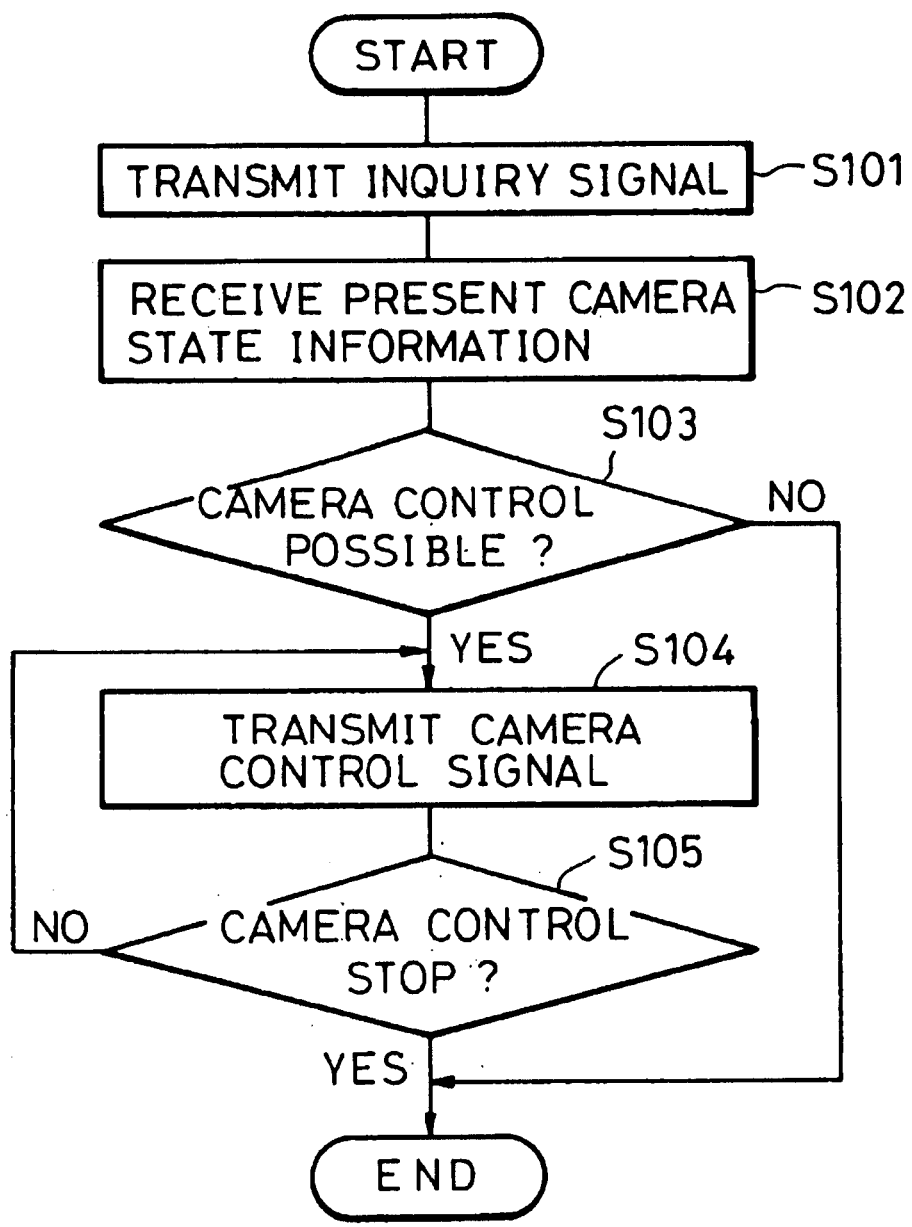
FIG. 9 is a flowchart of the operation of the image reception terminal when the image reception terminal outputs a camera control command.

FIG. 9 is a flowchart of operational processing in one of the image reception terminals 18 when the image reception terminal 18 outputs a command to control one of the cameras 16. The operation of controlling the camera 16 will be described with reference to FIG. 9.

Figure 11:
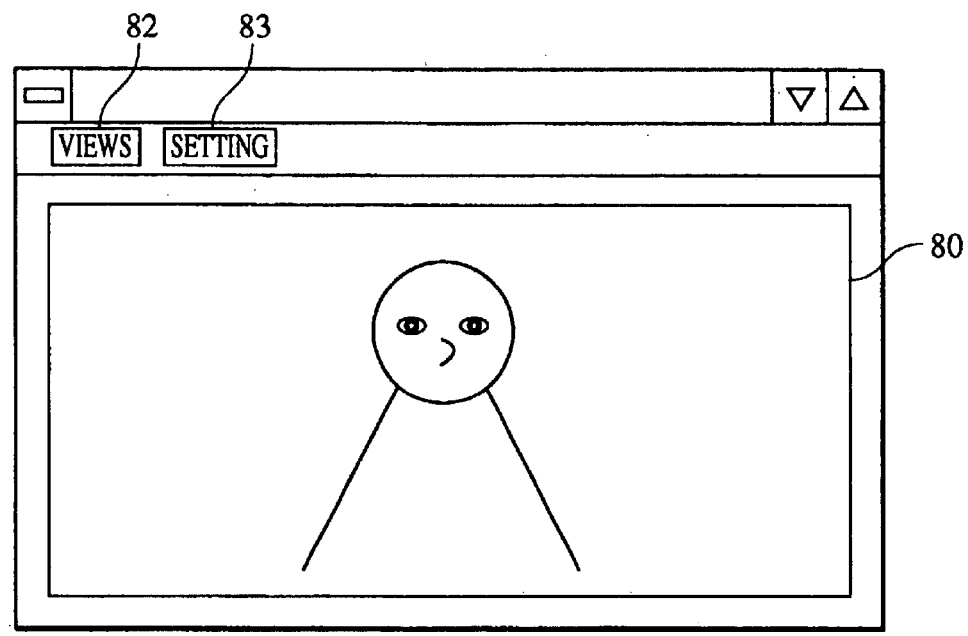
FIG. 11 is a diagram showing an example of a display on the monitor screen of the image reception terminal in the watch mode.

First, if clicking is performed on one of the image display areas 66a to 66f where an image from one of the cameras that the operator wishes to control is being displayed, then the above-described display windows are hanged into a watch mode window such as shown in FIG. 11.

Figure 17:
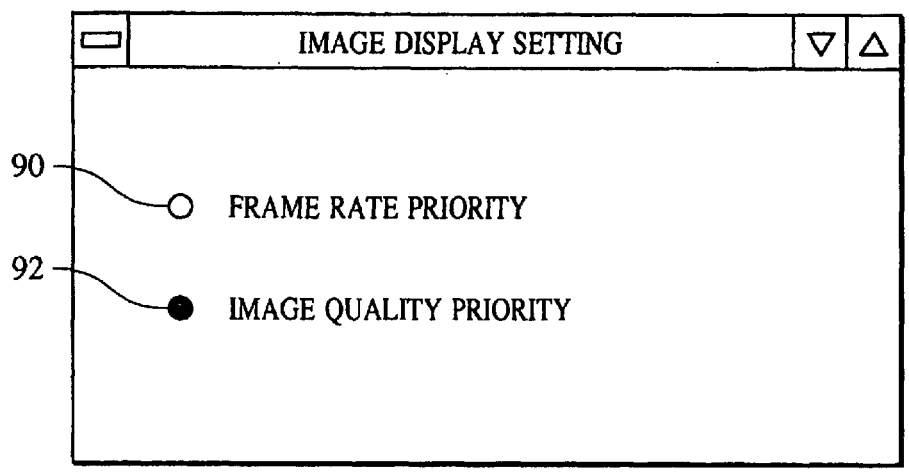
FIG. 17 is a diagram showing an example of an image display-setting window.

In the watch mode, one image is displayed in an enlarged state. At this time, it is possible to select a frame rate priority display such that a displayed moving image can move smoothly, or an image quality priority display at high resolution, which is made by reducing the compression rate. FIG. 17 shows an image display setting window for such an image display selection. In FIG. 17 are illustrated a frame rate priority button 90 and an image quality priority button 92. If one of these buttons is clicked, the quality of the image displayed in the window shown in FIG. 11 is changed. The window shown in FIG. 17 can be opened by clicking a setting button 83 shown in FIG. 11.

In step s101, after the display has been changed from the viewed mode to the watch mode, the camera control client 50 sends an inquiry signal to the camera control server 56 of the image transmission terminal 12, to which the camera 16 corresponding to the image displayed in the selected image display area is connected, to inquire whether or not the camera 16 is controllable.

Figure 10:
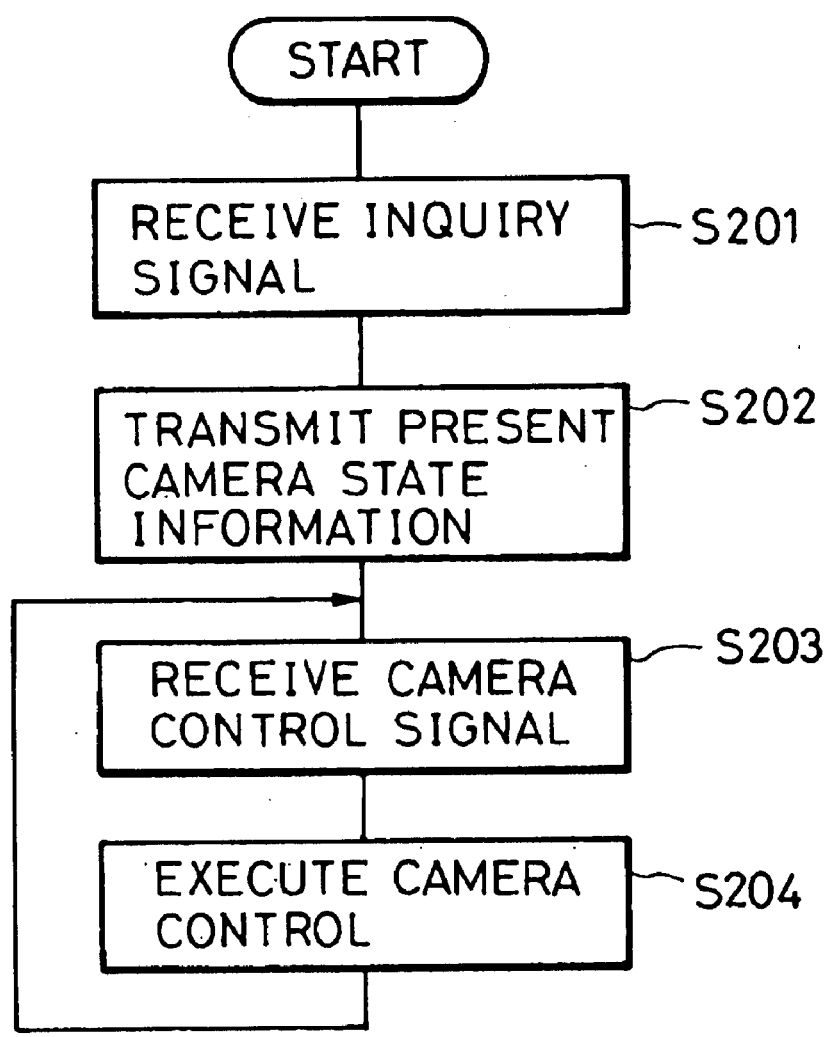
FIG. 10 is a flowchart of the operation of the image transmission terminal when camera control is executed.

Referring to FIG. 10, which is a flowchart showing operational processing in the image transmission terminal 12 at the time of controlling the camera 16, the camera control server 56 of the image transmission terminal 12 receives the inquiry signal in step s201 and sends information on the present status of the camera 16 (the state of use of camera 16 and the like) to the image reception software 52 of the image reception terminal 18 in step s202.

The image reception software 52 receives the camera status information in step s102 and then makes a determination in step s103 as to whether camera control with respect to pan and tilt or the like of the camera is possible from the received information on the present status of the camera 16.

If the result of the determination is that such camera control is possible, the image reception software 52 informs the camera control client 50 of this result and the camera control client 50 transmits a camera control signal to the camera control server 56 of the image transmission terminal 12. The camera control signal is formed by the operator in accordance with an operating method described below.

The camera control server 56 receives the camera control signal in step s203 and controls the operation of the camera 16 in accordance with the camera control signal in step s204.

If the result of the determination is that camera control is impossible, the image reception software 52 informs the camera control client 50 of this result and the camera control client 50 performs the control such that any control signal which may be input by the operator to execute a certain operation is ineffective.

In step s105, if the operator wishes to stop camera control, he or she may click a views button 82. The display window is thereby changed into watch mode windows such as those shown in FIG. 5. Simultaneously, the camera control process is terminated.

The method of controlling one of the cameras 16 forming an image displayed in the enlarged window in the watch mode as shown in FIG. 11 in the case where the camera is controllable will next be described in detail.

In this embodiment, in the case where an enlarged image is displayed in the watch mode, camera control is executed on the basis of a gestural sign which is described on the monitor 140 in a predetermined manner with the pen type pointing device 130, and which is detected by the pressure sensor 150 and is recognized by the CPU 122.

FIG. 12A to 12D show stroke patterns of gestural signs described on the monitor 140 with the pen type pointing device 130 when pan and tilt of one of the cameras 16 forming an image displayed in the watch mode window as shown in FIG. 11 are controlled.

Figure 12A:
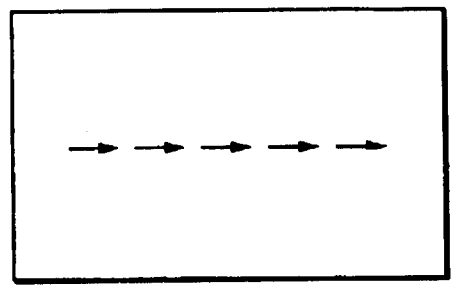
FIGS. 12A to 12D are diagrams showing stroke patterns of gestural signs.
Figure 12B:
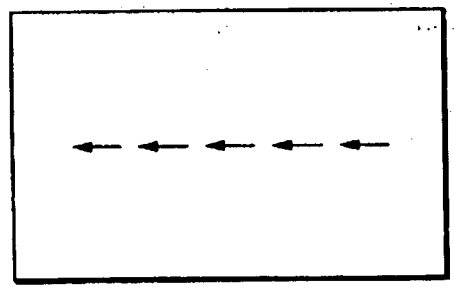
Figure 12C:
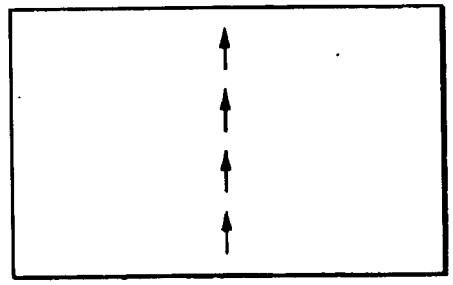
Figure 12D:
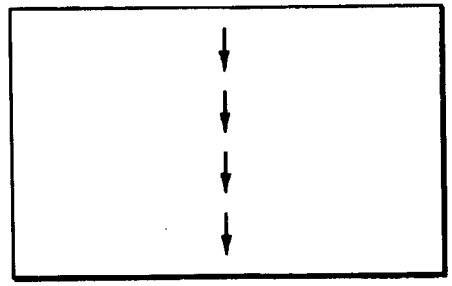

FIG. 12A shows a gestural sign for panning the camera 16 rightward (an operational form in which the pen type pointing device 130 describes a line on the monitor 140 from left to right). FIG. 12B shows a gestural sign for panning the camera 16 leftward (an operational form in which the pen type pointing device 130 describes a line on the monitor 140 from right to left). FIG. 12C shows a gestural sign for tilting the camera 16 so that the camera 16 faces upward (an operational form in which the pen type pointing device 130 describes a line on the monitor 140 along a direction from the bottom to the top). FIG. 12D shows a gestural sign for tilting the camera 16 so that the camera 16 faces downward (an operational form in which the pen type pointing device 130 describes a line on the monitor 140 along a direction from the top to the bottom). A row of a plurality of arrows shown in each of FIGS. 12A to 12D represents one gestural sign and indicates the size and the direction of the stroke of the gestural sign.

Figure 13A:
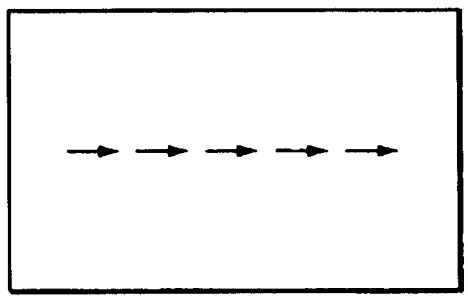
FIGS. 13A and 13B are diagrams showing stroke patterns of other gestural signs.
Figure 13B:
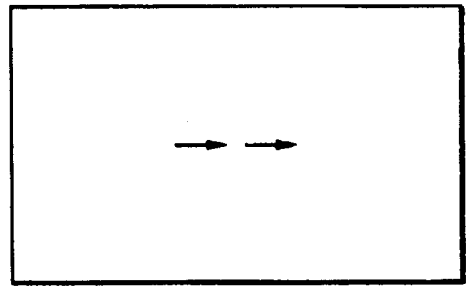

In this embodiment, the above-described pan and tilt control has a parameter variable according to the size (amount of stroke) of each kind of gestural sign. FIGS. 13A and 13B respectively show gestural signs each for panning the camera 16 rightward (an operational form in which the pen type pointing device 130 describes a line on the monitor 140 from left to right).

In comparison between FIGS. 13A and 13B, the amount of stroke shown in FIG. 13B is about ⅔ of the amount of stroke shown in FIG. 13A. The CPU 122 recognizes each of the different amounts of stroke and the stroke direction, determines the amount of rightward panning movement of the camera 16 according to the amount of the stroke, and transmits to the image transmission terminal 12 a camera control signal formed on the basis of these determination results.

While the pan and tilt control described above with reference to FIGS. 12A to 12D is performed by describing on the monitor 140 a line in the direction corresponding to a desired pan or tilt of the camera 16 by using the pen type pointing device, the operation of the pen type pointing device for pan and tilt control may alternatively be such that, as shown in FIGS. 19A to 19D, an arrow is described in the direction corresponding to a desired pan or tilt.

If a gestural sign comprising a segment B and an arrowhead segment A is formed in such a manner, the CPU 122 determines the direction of pan or tilt according to the direction of arrowhead segment A in relation to the direction of segment B of the gestural sign detected by the pressure sensor. FIGS. 19A to 19D respectively show a gestural sign for panning camera 16 rightward, a gestural sign for panning camera 16 leftward, a gestural sign for tilting camera 16 so that the camera faces upward, and a gestural sign for tilting camera 16 so that the camera faces downward. The amount of panning or tilting movement is determined from the length of segment B as in the case of pan and tilt control using lines described as shown in FIGS. 12A to 12D. The length of arrowhead segment A is not particularly limited.

Figure 14A:
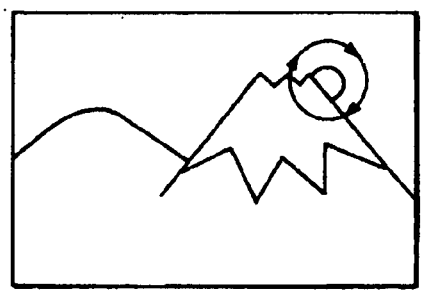
FIG. 14A is a diagram showing a stroke pattern of another gestural sign.
Figure 14B:
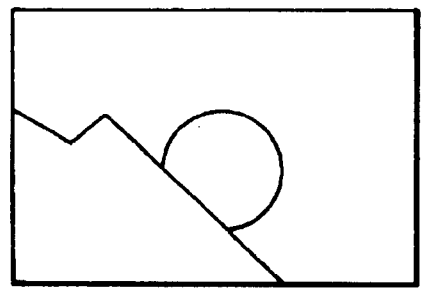
FIG. 14B is a diagram showing an image formed by the camera after control with the gestural sign shown in FIG. 14A.

FIG. 14A shows a stroke pattern of a gestural sign described on the monitor 140 with the pen type pointing device 130 when zoom control of one of the cameras 16 forming an image displayed in the watch mode window as shown in FIG. 11 is performed.

The gestural sign shown in FIG. 14A is formed by describing a substantially circular shape with the pen type pointing device 130, the circular shape surrounding an image area which is to be zoomed in. If a gesture is made as shown in FIG. 14A, the CPU 122 recognizes a circularly described gestural sign and also recognizes the position at which the gestural sign is formed and the size of the formed gestural sign.

Then, the CPU 122 transmits a control signal to the image transmission terminal 12 to perform panning and tilting so that the center of the circle described at a position on the image is positioned at the center of the window. Simultaneously, the CPU 122 transmits a signal for controlling the zoom ratio according to the size of the described circle to the image transmission terminal 12.

Figure 20A:
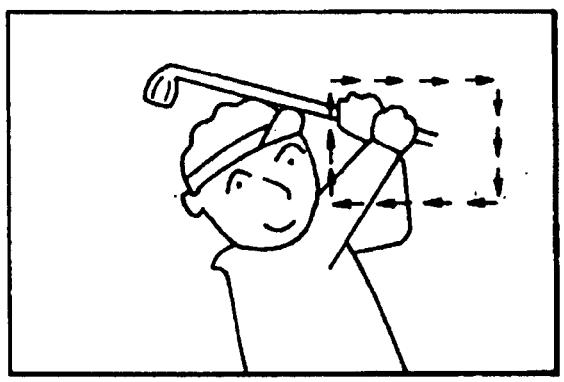
FIG. 20A is a diagram showing a stroke pattern of another gestural sign.

While pan, tilt and zoom control of camera 16 using a circularly described gestural sign such as that shown in FIG. 14A has been described, a rectangularly described gestural sign such as that shown in FIG. 20A may also be formed on the screen of the monitor 140 with the pen type pointing device 130 so as to surround an image area which is selected to be displayed in an enlarged state.

If such a rectangular gesture is made, the CPU 122 can definitely recognize the enlargement target area to accurately form commands for controlling pan, tilt and zoom of camera 16.

Figure 20B:
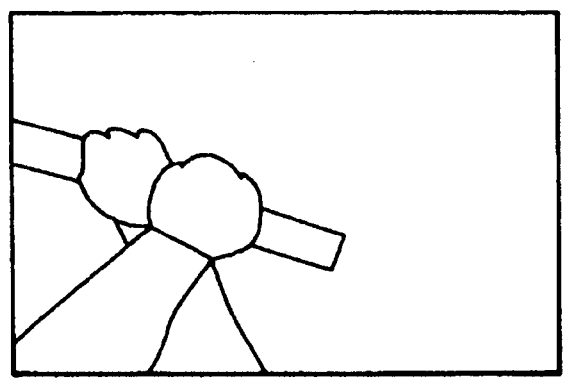
FIG. 20B is a diagram showing an image formed by the camera after control with the gestural sign shown in FIG. 20A.
Figure 21:
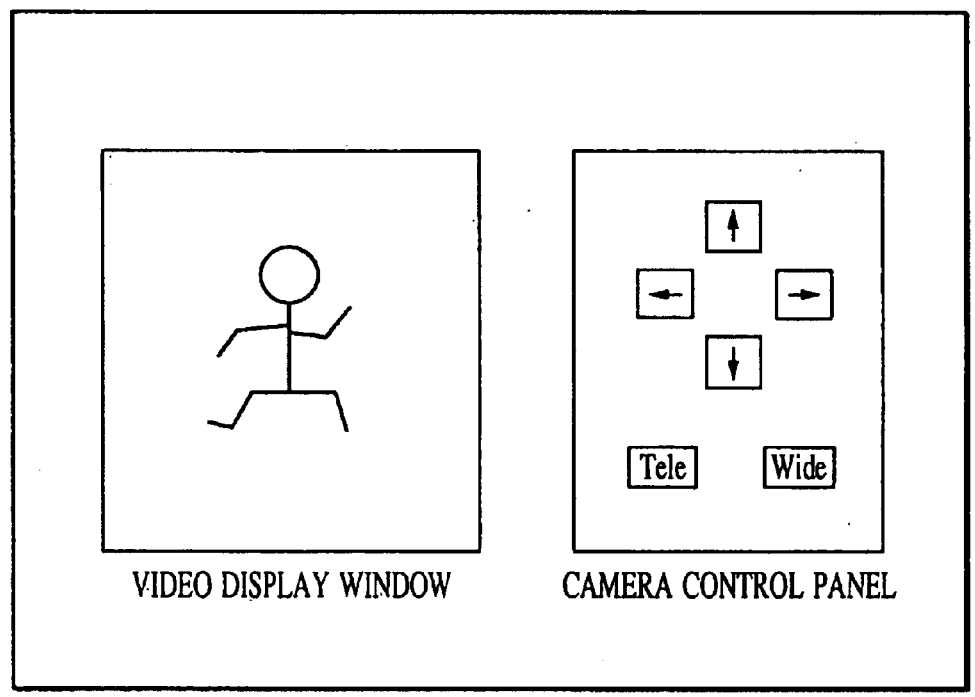
FIG. 21 is a diagram showing an example of a conventional display window.

FIG. 20B shows an image displayed when the rectangularly described gestural sign shown in FIG. 20A is given to execute pan, tilt and zoom control of camera 16.

Figure 15A:
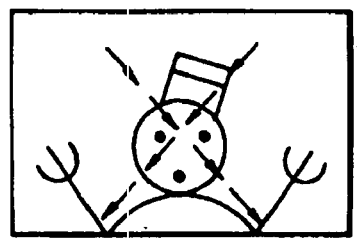
FIG. 15A is a diagram showing a stroke pattern of another gestural sign.
Figure 15B:
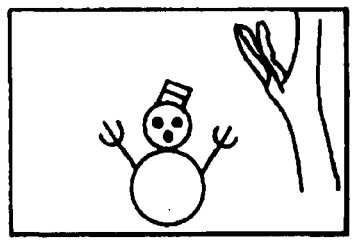
FIG. 15B is a diagram showing an image formed by the camera after control with the gestural sign shown in FIG. 15A.

FIG. 15A shows a stroke pattern of a gestural sign described on the monitor 140 with the pen type pointing device 130 when zoom control of one of the cameras 16 forming an image displayed in the watch mode window as shown in FIG. 11 is performed.

As shown in FIG. 15A, a gesture is made such as to describe "x" with the pen type pointing device 130 on an area of the image which is to be zoomed out. The CPU 122 then recognizes the described gestural sign as "x" and also recognizes the position at which the gestural sign is formed and the size of the formed gestural sign.

The CPU 122 transmits a control signal to the image transmission terminal 12 to perform panning and tilting so that the point of intersection of the two segments forming "x" is positioned at the center of the window. Simultaneously, the CPU 122 transmits a control signal for reducing the zoom ratio according to the size of the described "x" to the image transmission terminal 12. In this embodiment, if the size of "x" is increased, the zoom ratio designated by the control signal is reduced.

Figure 16:
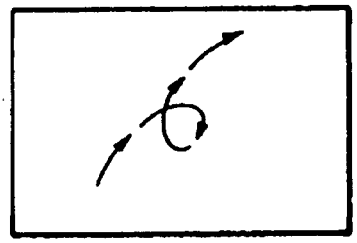
FIG. 16 is a diagram showing a stroke pattern of another gestural sign.

FIG. 16 shows a gestural operation of moving the pen type pointing device 130 so as to form one loop on the screen of the monitor 140. When the CPU 120 recognizes such a gesture, it stops controlling the camera 16 forming the image displayed on the screen and loses the power of controlling the camera 16.

Figure 18:
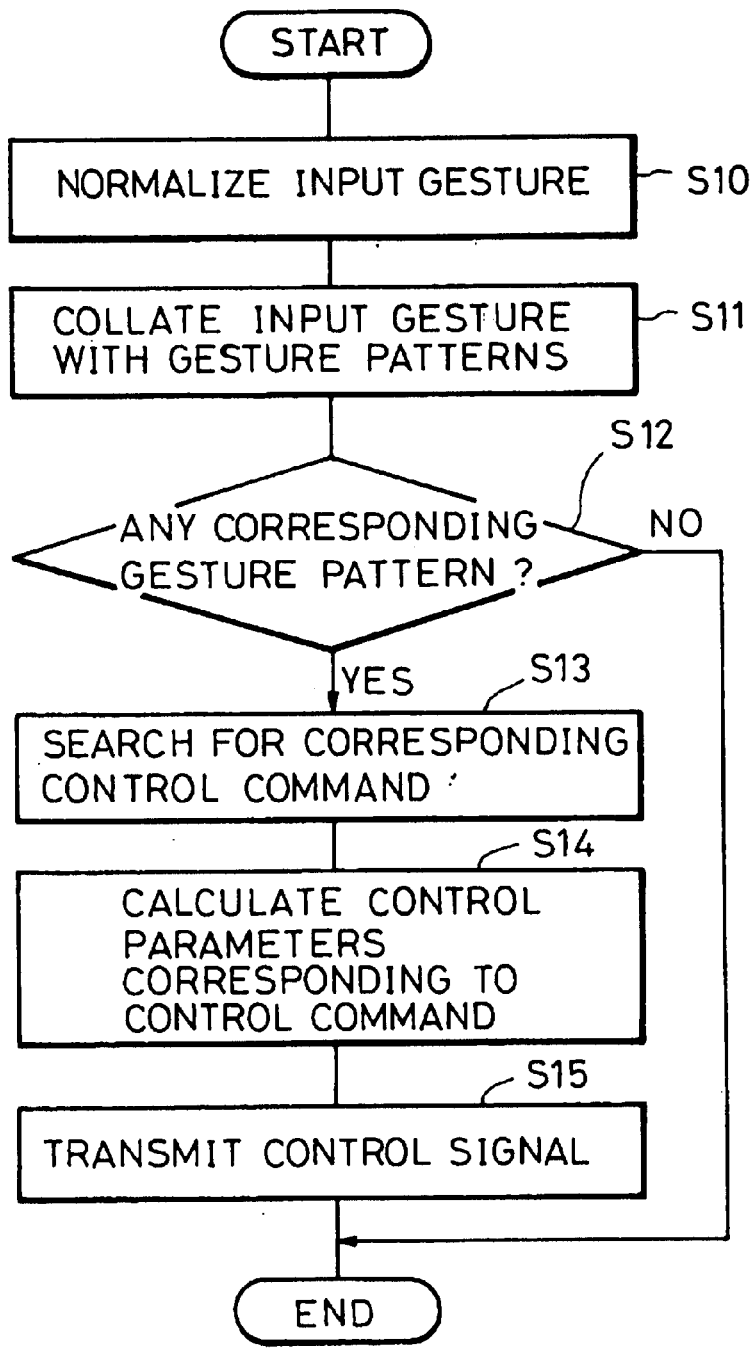
FIG. 18 is a flowchart of the processing operation of a CPU in the image reception terminal.
Figure 19A:
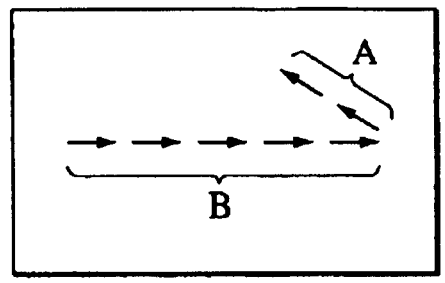
FIGS. 19A to 19D are diagrams showing stroke patterns of other gestural signs.
Figure 19B:
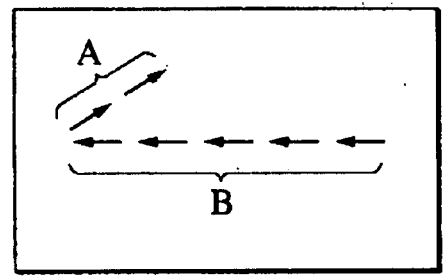
Figure 19C:
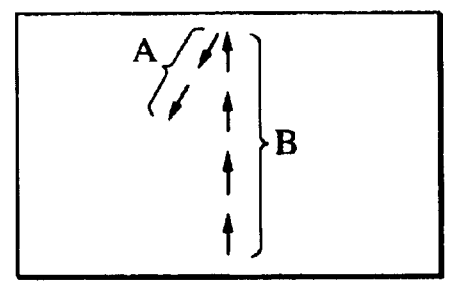
Figure 19D:
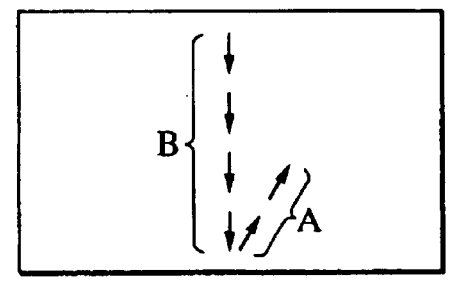

FIG. 18 is a flowchart of the processing operation of the CPU 122 in the case where a gestural sign, such as one in those described above, is formed by the operator.

In step s10, an input gesture is normalized on the basis of the signal representing the result of detection made by the pressure sensor 150. Next, in step s11, the normalized input gesture pattern is collated with gesture patterns previously stored in the external storage 126 (with respect to processing relating to the gesture and the stroke of the gesture).

If collation in step s12 ends in failure, no processing is performed thereafter and the process ends. If collation in step s12 ends in success, a control command (for pan, tilt, zoom or the like) corresponding to the collated gesture pattern is searched for in step s13. In step s14, some of various control parameters, which are the amount of panning movement, the amount of tilting movement, the zoom ratio and so on, is calculated from the size of the gesture pattern or the position at which the gesture pattern is formed.

For example, in pan and tilt control of camera 16 with respect to gestures such as those shown in FIGS. 12A to 12D, each of the amount of panning movement and the amount of tilting movement is determined from the amount of stroke of the corresponding gesture. With respect to the gesture shown in FIG. 14A or 15A, the pan and tilt parameters are calculated so that the center of the gesture is positioned at the center of the window. Further, the zoom ratio is calculated from the size of the gesture.

In step s15, a control signal for executing control using some of the various parameters calculated as described above is transmitted to the image transmission terminal 12 through the network.

In this embodiment, normalization of an input gesture, the collation of the gesture pattern and search for a corresponding control command, and camera control in accordance with the control command found by searching are executed on the image reception terminal 18 side. However, the arrangement may alternatively be such that the input gesture signal is immediately transmitted from the image reception terminal 18 to the image transmission terminal 12 and the above-described operational processing is performed in the image transmission terminal 12.

This operation method can easily be practiced in such a manner that a control program for executing the above-described operational processing is stored in the secondary storage 28 or the external storage 26, and the CPU 22 reads out the control program to the main storage 24 and executes the camera control processing in accordance with the program.

As described above, the camera 16 corresponding to a displayed image can easily be controlled by performing a gestural operation on the screen of the monitor 140 with the pen type pointing device 130. If this camera control is performed, the need for provision of an operation panel for camera control on the screen of the monitor 140 is eliminated, so that the image formed by the camera can be displayed without being obstructed by the operation panel, that is, the image display area can be enlarged by the amount corresponding to the operation panel area.

According to the above-described embodiment of the resent invention, the arrangement may alternatively be such hat a recording medium on which program codes of software for realizing the above-described functions is supplied to a system or unit, and this system or unit (CPU, MPU or the like) reads out the program codes stored in the storage medium and executes processings in accordance with the program codes.

In such a case, the program codes themselves realize the functions of the embodiment described above, and the storage medium storing the program codes constitutes this embodiment.

The storage medium used to supply program codes may be, for example, a floppy disk, a hard disk, an optical disk, an magneto-optical disk, a compact disk read only memory (CD-ROM), CD-Recordable, a magnetic tape, nonvolatile memory card, or a read only memory.

The method for realizing the functions of the above-described embodiment by executing processing in accordance with program codes read out by a computer may also comprise performing a part or the whole of the actual processing with an operating system or the like running on the computer in accordance with instructions of the program codes.

Further, after the program codes read out from the recording medium have been written to a feature expansion board inserted in the computer or to a memory provided in a feature expansion unit inserted in the computer, a CPU or the like provided in the feature expansion board or unit performs a part or the whole of the actual processing in accordance with instructions of the program codes, thereby realizing the functions of the above-described embodiment.

If the above-described recording medium is used, the program codes corresponding to the above-described flowcharts are stored. Briefly, modules necessary for the camera control system of the present invention are stored in the storage medium.

According to the above-described embodiment of the present invention, at least program codes of a "normalization module" for normalizing an input gesture, a "collation module" for collating the gesture normalized by the normalization module with gesture patterns previously stored, and a "parameter calculation module" for calculating each of various control parameters from the size of the input gesture or the position of the gesture on the screen may be stored in the storage medium.

According to the embodiment of the present invention, as described above, it is possible to provide a camera control system which makes it possible to easily control pan, tilt or zoom of a camera through a network by performing a predetermined gestural operation on a display window while an image formed by the camera is being displayed in the display window, which requires no camera control operation panel on the screen of the monitor since such camera control is performed, and which therefore enables the image formed by the camera to be displayed by being fully enlarged over the monitor screen while enabling the desired camera control.

According to the embodiment of the present invention, it is also possible to provide an image receiving apparatus in which pan, tilt or zoom of a camera can easily be controlled through a network by performing a predetermined gestural operation on a display window while an image formed by the camera is being displayed in the display window, which requires no camera control operation panel on the screen of the monitor since such camera control is performed, and in which the image formed by the camera can therefore be displayed by being fully enlarged over the monitor screen while the desired camera control can be performed.

According to the embodiment of the present invention, it is also possible to provide a method of controlling an image receiving apparatus which makes it possible to easily control pan, tilt or zoom of a camera through a network by performing a predetermined gestural operation on a display while an image formed by the camera is being displayed in the display window, which eliminates the need for a camera control operation panel on the screen of the monitor by using the arrangement for such camera control, and which therefore enables the image formed by the camera to be displayed by being fully enlarged over the monitor screen while enabling the desired camera control.

According to the embodiment of the present invention, it is also possible to provide a storage medium for storing a control program which makes it possible to easily control pan, tilt or zoom of a camera through a network by performing a predetermined gestural operation on a display while an image formed by the camera is being displayed in the display window, which eliminates the need for a camera control operation panel on the screen of the monitor by using the arrangement for such camera control, and which therefore enables the image formed by the camera to be displayed by being fully enlarged over the monitor screen while enabling the desired camera control.

While the present invention has been described with respect to what presently is considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera control apparatus comprising:
    a display device that displays an image sensed by a camera, in accordance with an image signal output from the camera;
    a detection device that detects a figure scripted on a display screen on which the image is being displayed by said display device;
    a selection device that collates a pattern of the figure detected by said detection device with figure patterns previously stored in a storage device, and selects a command to control a predetermined function of the camera in accordance with a figure pattern which corresponds to the detected figure; and
    an output device that outputs the command,
    wherein said output device outputs a control command for at least one of pan control, tilt control, and zoom control of the camera,
    wherein if said detection device detects a substantially circular figure is scripted on the display screen, then said output device outputs a command for controlling the zoom ratio according to a size of the substantially circular figure detected, and wherein if said detection device detects a substantially circular figure is scripted on the display screen, then said output device further outputs a control command for performing at least one of pan and tilt of the camera such that an image displayed at a center of the substantially circular figure is positioned at a center of the display screen.

2. A camera control apparatus comprising:

a display device that displays an image sensed by a camera, in accordance with an image signal output from the camera;

a detection device that detects a figure scripted on a display screen on which the image is being displayed by said display device;

a selection device that collates a pattern of the figure detected by said detection device with figure patterns previously stored in a storage device, and selects a command to control a predetermined function of the camera in accordance with a figure pattern which corresponds to the detected figure; and an output device that outputs the command, wherein said output device outputs a control command for at least one of pan control, tilt control, and zoom control of the camera, wherein if said detection device detects a line is scripted so as to form one loop on the display screen, then said output device outputs a control command for terminating control of the camera.

3. A method of controlling a camera control system comprising:

a detection step of detecting a figure scripted on a display screen on which an image formed by a camera is being displayed;

a selection step of collating a pattern of a figure detected in said detecting step with figure patterns previously stored in a storage device, and selecting a command to control a predetermined function of the camera in accordance with a figure pattern corresponding to the detected figure; and an output step of outputting the selected command, wherein said output step comprises outputting a control command for at least one of pan control, tilt control, and zoom control of the camera, wherein said detecting step includes detecting scripting of a substantially circular figure on the display screen, and said output step includes outputting a command for controlling the zoom ratio in accordance with the size of the substantially circular figure detected in said detecting step, and wherein said output step includes outputting a control command for performing at least one of pan and tilt of the camera so that an image displayed at a center of the substantially circular figure detected in said detecting step is positioned at a center of the display screen.

4. A method of controlling a camera control system comprising:

a detection step of detecting a figure scriped on a display screen on which an image formed by a camera is being displayed;

a selection step of collating a pattern of a figure detected in said detecting step with figure patterns previously stored in a storage device, and selecting a command to control a predetermined function of the camera in accordance with a figure pattern corresponding to the detected figure; and an output step of outputting the selected command, wherein said output step comprises outputting a control command for at least one of pan control, tilt control, and zoom control of the camera, and wherein said detection step includes detecting an action of scripting a line so as to form one loop on the display screen, and said output step includes outputting a control command for terminating control of the camera in response to detection of a scripted loop in said detection step.

5. A storage medium storing a computer executable program for controlling a camera control apparatus, the stored program including computer executable code for causing the apparatus to perform the following functions:

displaying an image formed by a camera, in accordance with an image signal output from the camera;

detecting a figure scripted on a display screen on which the image is being displayed;

collating a pattern of the detected figure with figure patterns previously stored in a storage device;

selecting a command to control a predetermined function of the camera in accordance with a figure pattern which corresponds to the detected figure; and outputting the selected command, wherein the stored program includes computer executable code for causing the camera control apparatus to output a control command for at least one of pan control, tilt control, and zoom control of the camera, wherein the stored program includes computer executable code for causing the camera control apparatus to detect a scripting of a substantially circular figure on the display screen, and to output a command for controlling the zoom ratio in accordance with the size of the substantially circular figure detected, and wherein the stored program includes computer executable code for causing the camera control apparatus to output a control command for performing at least one of pan and tilt of the camera such that an image displayed at a center of the substantially circular figure is positioned at a center of the display screen.

6. A storage medium storing a computer executable program for controlling a camera control apparatus, the stored program including computer executable code for causing the apparatus to perform the following functions:

displaying an image formed by a camera, in accordance with an image signal output from the camera;

detecting a figure scripted on a display screen on which the image is being displayed;

collating a pattern of the detected figure with figure patterns previously stored in a storage device;

selecting a command to control a predetermined function of the camera in accordance with a figure pattern which corresponds to the detected figure; and outputting the selected command, wherein the stored program includes computer executable code for causing the camera control apparatus to output a control command for at least one of pan control, tilt control, and zoom control of the camera, and wherein the stored program includes computer executable code for causing the camera control apparatus to detect a scripting of a line that forms one loop on the display screen, and to output a control command for terminating control of the camera in response to the detection.

* * * * *

UNITED STATES PATENT AND TRADEMARK OFFICE
CERTIFICATE OF CORRECTION

| | |
|---|---|
| PATENT NO. | : 7,061,525 B1 |
| APPLICATION NO. | : 09/009932 |
| DATED | : June 13, 2006 |
| INVENTOR(S) | : Koichiro Tanaka et al. |

It is certified that error appears in the above-identified patent and that said Letters Patent is hereby corrected as shown below:

ON THE TITLE PAGE, ITEM (30):

"9/013943" should read --9-013943--.

Column 7
    Line 29, "hanged" should read --changed--.

Column 11
    Line 8, "resent" should read --present--.
    Line 9, "hat" should read --that--.

Column 13
    Line 59, "scriped" should read --scripted--.

Signed and Sealed this

First Day of May, 2007

JON W. DUDAS
*Director of the United States Patent and Trademark Office*